(12) United States Patent
Shen et al.

(10) Patent No.: US 10,093,260 B2
(45) Date of Patent: Oct. 9, 2018

(54) VEHICLES INCLUDING FRONT GRILLE ASSEMBLIES WITH AUXILIARY LEVER ACCESS PANELS

(71) Applicant: Toyota Motor Engineering & Manufacturing North America, Inc., Erlanger, KY (US)

(72) Inventors: Mingher Fred Shen, Ann Arbor, MI (US); Scott L. Frederick, Brighton, MI (US); Brandon W. Letcher, Ypsilanti, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/427,540

(22) Filed: Feb. 8, 2017

(65) Prior Publication Data

US 2018/0222418 A1    Aug. 9, 2018

(51) Int. Cl.
*B60R 19/52*     (2006.01)
*B62D 25/12*     (2006.01)
*E05B 83/24*     (2014.01)
*B62D 25/10*     (2006.01)

(52) U.S. Cl.
CPC .............. *B60R 19/52* (2013.01); *B62D 25/12* (2013.01); *E05B 83/24* (2013.01); *B62D 25/105* (2013.01)

(58) Field of Classification Search
CPC .............................. B62D 25/105; B60R 19/52

USPC ...... 296/193.1, 193.11; 180/69.2, 69.22, 68.6
See application file for complete search history.

(56) References Cited

U.S. PATENT DOCUMENTS

| | | | |
|---|---|---|---|
| 2,796,141 A | * | 6/1957 | Schreiner ................ B60R 19/52 |
| | | | 165/119 |
| 3,544,786 A | * | 12/1970 | Baker ................... B60K 11/085 |
| | | | 246/1 R |
| 3,966,244 A | | 6/1976 | Kleisser et al. |
| 4,057,271 A | | 11/1977 | Colinet |
| 4,441,345 A | | 4/1984 | Guarr |
| 5,046,768 A | | 9/1991 | Myslicki |
| 5,150,933 A | | 9/1992 | Myslicki et al. |
| 8,052,188 B2 | | 11/2011 | Chernoff et al. |

FOREIGN PATENT DOCUMENTS

| | | | |
|---|---|---|---|
| DE | 4020473 | | 1/1992 |
| DE | 19718594 | * | 3/2007 |
| JP | H08177283 | | 7/1996 |

* cited by examiner

*Primary Examiner* — Dennis H Pedder
(74) *Attorney, Agent, or Firm* — Dinsmore & Shohl LLP

(57) ABSTRACT

A vehicle includes a hood assembly that is located above an engine compartment. A hood latch assembly includes an auxiliary latch assembly. The auxiliary latch assembly includes an auxiliary lever that unlatches the auxiliary latch assembly from the hood assembly. A front grille assembly has an auxiliary lever access location formed as an opening between the hood assembly and the front grille assembly. An auxiliary lever access panel has a closed configuration that conceals at least a portion of the opening and an open configuration that exposes the opening to access the auxiliary lever.

20 Claims, 7 Drawing Sheets

VEHICLES INCLUDING FRONT GRILLE ASSEMBLIES WITH AUXILIARY LEVER ACCESS PANELS

TECHNICAL FIELD

The present specification generally relates to front grille assemblies of vehicles and, more specifically, to front grille assemblies that include auxiliary lever access panels.

BACKGROUND

Vehicles typically have hood assemblies that are unlatched before they are opened. In many instances, the hood assemblies use a hood latch assembly that can be unlocked from inside the vehicle and then unlatched from outside the vehicle using a lever. The lever may be positioned underneath the hood assembly. As there may be some clearance below the hood assembly, the lever and lever access area may be visible from outside the vehicle. Further, the lever may have a different appearance than surrounding vehicle components, which can emphasize the presence of the lever.

Accordingly, a need exists for front grille assemblies that include an auxiliary lever access panel that can be used to conceal presence of an auxiliary lever access location.

SUMMARY

In one embodiment, a vehicle includes a hood assembly that is located above an engine compartment. A hood latch assembly includes an auxiliary latch assembly. The auxiliary latch assembly includes an auxiliary lever that unlatches the auxiliary latch assembly from the hood assembly. A front grille assembly has an auxiliary lever access location formed as an opening between the hood assembly and the front grille assembly. An auxiliary lever access panel has a closed configuration that conceals at least a portion of the opening and an open configuration that exposes the opening to access the auxiliary lever.

In another embodiment, a front grille assembly for a vehicle includes an auxiliary lever access location formed as an opening through an exterior panel. An auxiliary lever access panel connected to the exterior panel. The auxiliary lever access panel has a closed configuration that conceals at least a portion of the opening and an open configuration that exposes the opening.

In another embodiment, a method of providing access to an auxiliary lever of a hood latch assembly includes providing an auxiliary lever access location through an exterior panel of a front grille assembly. An auxiliary lever access panel is connected to the front grille assembly thereby concealing at least a portion of the opening. The auxiliary lever access panel has a closed configuration that conceals the at least the portion of the opening and an open configuration that exposes the opening to access the auxiliary lever.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to vehicles and front grille assemblies that include auxiliary lever access panels that conceal an auxiliary lever access location when viewing from outside the vehicle. The vehicles may include a hood assembly and a front grille assembly, both located at a front portion of the vehicle. Located between the hood assembly and the front grille assembly is a hood latch assembly that can be used to lock the hood assembly in a closed position relative to a vehicle frame. The hood latch assembly may include a primary latch assembly and an auxiliary latch assembly. The primary latch assembly may be openable from inside the vehicle, while the auxiliary latch assembly may be openable from outside the vehicle. The auxiliary latch assembly may be actuated using an auxiliary lever that is located beneath the hood assembly. An auxiliary lever access location may be provided as a gap between the hood assembly and the front grille assembly. The auxiliary lever access location may be concealed using a moveable auxiliary lever access panel that blends with the surrounding vehicle components to provide an appearance without the auxiliary lever access location and any associated gap.

Figure 1:
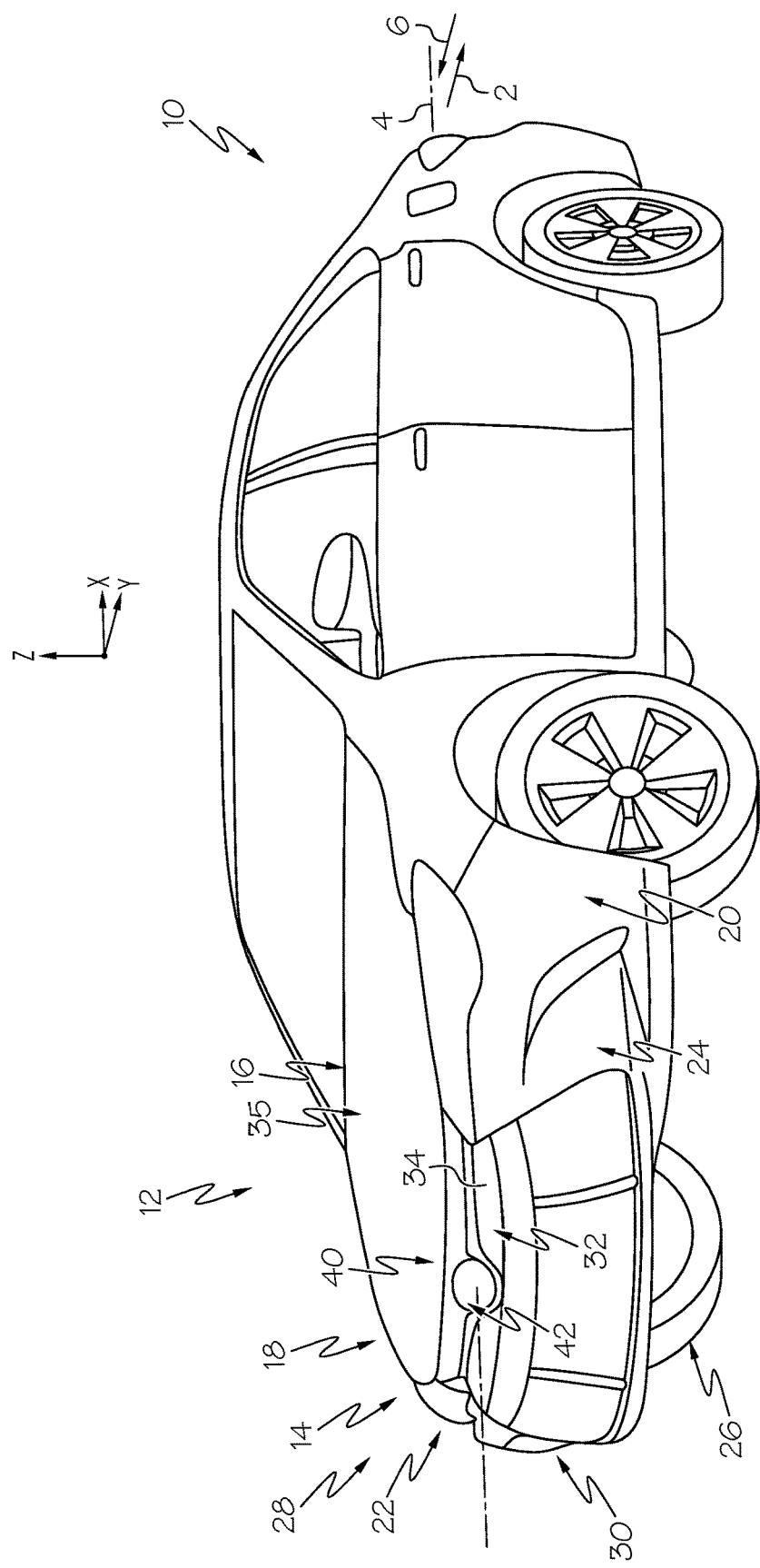
FIG. 1 depicts a perspective view of a vehicle, according to one or more embodiments shown and described herein.

As used herein, the term "vehicle longitudinal direction" refers to the forward-rearward direction of the vehicle (i.e., in the +/−vehicle X-direction depicted in FIG. 1). The term "vehicle lateral direction" refers to the cross-vehicle direction (i.e., in the +/−vehicle Y-direction depicted in FIG. 1), and is transverse to the vehicle longitudinal direction. The term "vehicle vertical direction" refers to the upward-downward direction of the vehicle (i.e., in the +/−vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

The vehicle 10 includes a vehicle body 12 having a front end assembly 14 that includes a hood assembly 16, front fenders 18 and 20, an upper grille assembly 22, a front bumper structure 24, a lower grille assembly 26 and a front fascia 30, together referred to as a front grille assembly 28. The upper grille assembly 22 and the lower grille assembly 26 are connected to the front bumper structure 24 and are located between the front fenders 18 and 20. Generally, the upper grille assembly 22 includes a covering portion 32 with a grille deflector 34, such as a mesh or other suitable covering that protects a radiator and engine that are located behind the front grille assembly 28 within an engine compartment 35, while allowing air to flow past the covering portion 32 and over the radiator.

FIG. 1 illustrates the hood assembly 16 in a closed configuration. In the closed configuration, a front portion 40 of the hood assembly 16 extends in the vehicle longitudinal direction over at least a portion of the front grille assembly 28. As will be described in greater detail below, the front portion 40 of the hood assembly 16 overhangs an auxiliary lever access location, referred to as element 42 that is located between the hood assembly 16 and the front grille assembly 28. In some embodiments, the auxiliary lever access location 42 is formed as a part of the front grille assembly 28.

Figure 2:
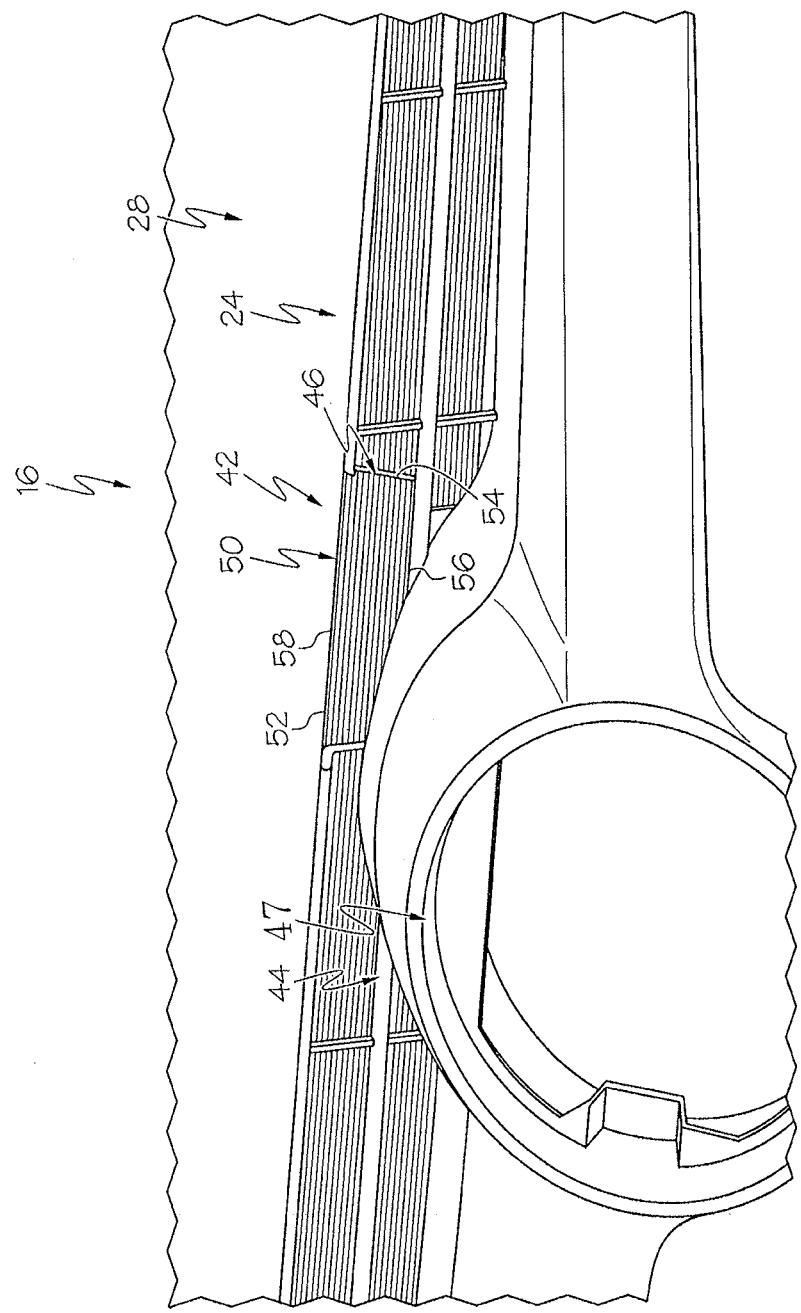
FIG. 2 is a detail view of an auxiliary lever access location of the vehicle of FIG. 1 including an auxiliary lever access panel in a closed configuration, according to one or more embodiments shown and described herein.

Referring to FIG. 2, the upper grille assembly 24 of the front grille assembly 28 is illustrated in greater detail with the hood assembly 16 in the closed configuration. In the illustrated embodiment, the upper grille assembly 24 may include an emblem retaining structure 44 that includes an emblem fastening portion 47 located centrally along the front grille assembly 28 in the vehicle lateral direction. The auxiliary lever access location 42 may be located above the emblem retaining structure 44; however, the auxiliary lever access location 42 may be located at any suitable location in the vehicle lateral direction depending, for example, on a position of an auxiliary latch.

The auxiliary lever access location 42 may be provided between the upper grille assembly 24 and the hood assembly 16. In some embodiments, the auxiliary lever access location 42 is formed as a gap or opening 46 that is provided in the upper grille assembly 24. For example, the auxiliary lever access location 42 may be formed when forming (e.g., molding) the upper grille assembly 24 and/or may be formed (e.g., machining) after forming the upper grille assembly 24.

The opening 46 at the auxiliary access location 42 is filled or covered using a moveable auxiliary lever access panel 50. In FIG. 2, the auxiliary lever access panel 50 is illustrated in a closed configuration. As can be seen, the auxiliary lever access panel 50 may have a perimeter 52 that is shaped to correspond to a perimeter 54 of the opening 46. Such an arrangement can allow nearly all (e.g., at least about 75 percent) or the entirety (e.g., about 100 percent) of the area of the opening 46 at the upper grille assembly 24 to be covered or filled by the auxiliary lever access panel 50. In some embodiments, the opening 46 and the auxiliary lever access panel 50 may be trapezoidal in shape with a bottom end 56 of the auxiliary lever access panel 50 being shorter in the vehicle lateral direction than a top end 58 of the auxiliary lever access panel 50. In other embodiments, other shapes may be used, such as rounded, rectangular, irregular shapes, etc. The shapes chosen for the opening 46 and the auxiliary lever access panel 50 may be chosen depending on, for example, geometry of the front grille assembly 28, geometry of the hood assembly 16, location of the auxiliary lever, etc.

Figure 3:
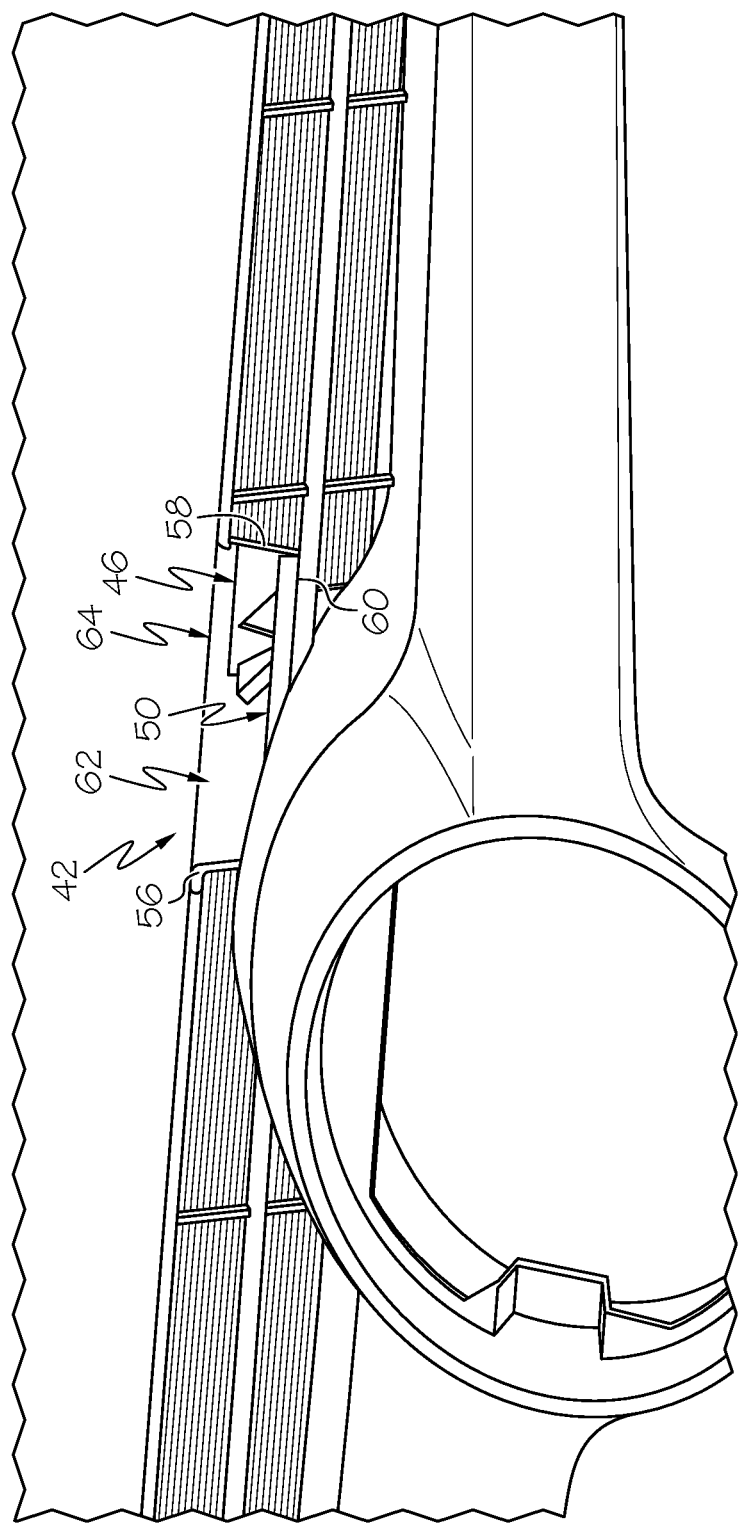
FIG. 3 is a detail view of the auxiliary lever access location of FIG. 2 with the auxiliary lever access panel in an open configuration, according to one or more embodiments shown and described herein.

FIG. 3 illustrates the opening 46 at the auxiliary access location 42 with the auxiliary lever access panel 50 in an open configuration. As can be seen, the opening 46 includes sides 56 and 58 and a bottom 60 that are formed by the upper grille assembly 24. A top 62 may be unbounded by the upper grille assembly 24 and provided by the hood assembly 16 with the hood assembly 16 in the closed configuration. The opening 46 may also be trapezoidal in shape with the bottom 60 being shorter in the vehicle lateral direction than the top 62. As mentioned above, the opening 46 may any suitable shape, such as rounded, rectangular, irregular, etc.

As will be described in greater detail below, placing the auxiliary lever access panel 50 in the open configuration can expose an auxiliary lever of a hood latch assembly 64. For example, an operator may user a hand to place the auxiliary lever access panel 50 in the open configuration and access the auxiliary lever of the hood latch assembly 64 through the opening 46. The auxiliary lever access panel 50 may be readily moveable between the open configuration that allows access to the auxiliary lever and the closed configuration that hides the auxiliary lever access opening 42 by filling the opening 46.

Figure 4:
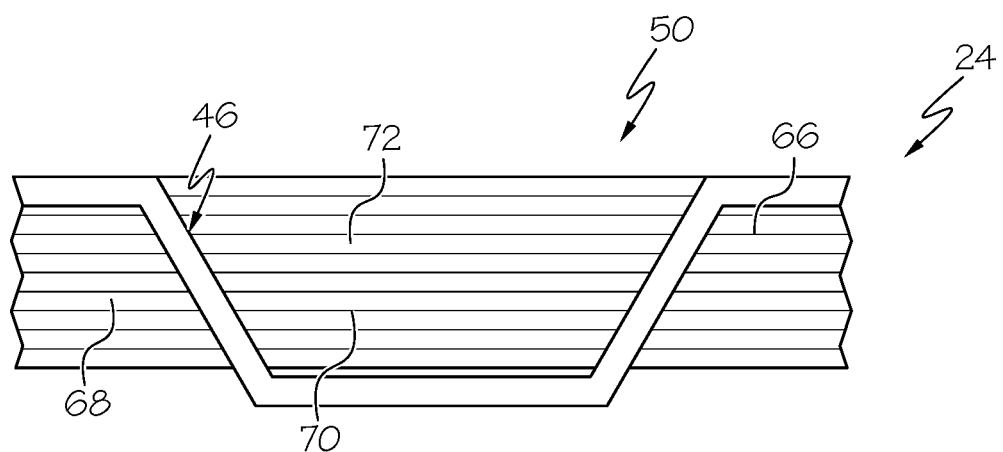
FIG. 4 is a detail view of the auxiliary lever access panel of FIG. 2, according to one or more embodiments shown and described herein.

The auxiliary lever access panel 50 may be sized and patterned to conceal the existence of the opening 46 while reducing contour inconsistencies between the auxiliary lever access panel 50 and surrounding areas of the front grille assembly 28 beneath the hood assembly 16 due to the existence of the opening 46. Referring to FIG. 4, as an example, the auxiliary lever access panel 50 is illustrated in the closed configuration side-by-side with an exterior panel 66 of the upper grille assembly 24. The auxiliary lever access panel 50 may be provided to mimic the appearance of the exterior panel 66 to reduce the visual impact of the opening 46 of the auxiliary lever access location 42 and provide a continuous exterior panel 66 appearance across the upper grille assembly 24. For example, the auxiliary lever access panel 50 may be substantially the same color as the exterior panel 66. In some embodiments where the exterior panel is chrome or other color metallic or otherwise, the auxiliary lever access panel 50 may also be a matching chrome or other color metallic or otherwise.

Further, the auxiliary lever access panel 50 may have an exterior texture that matches or mimics the exterior texture of the exterior panel 66. For example, the exterior panel 66 may include vanes or ridges 68 that extend widthwise along the exterior panel 66 in the vehicle lateral direction. Matching ridges 70 may also be provided on an exterior facing side 72 of the auxiliary lever access panel 66 to provide a continuous exterior between the exterior panel 66 and the auxiliary lever access panel 50.

Figure 5:
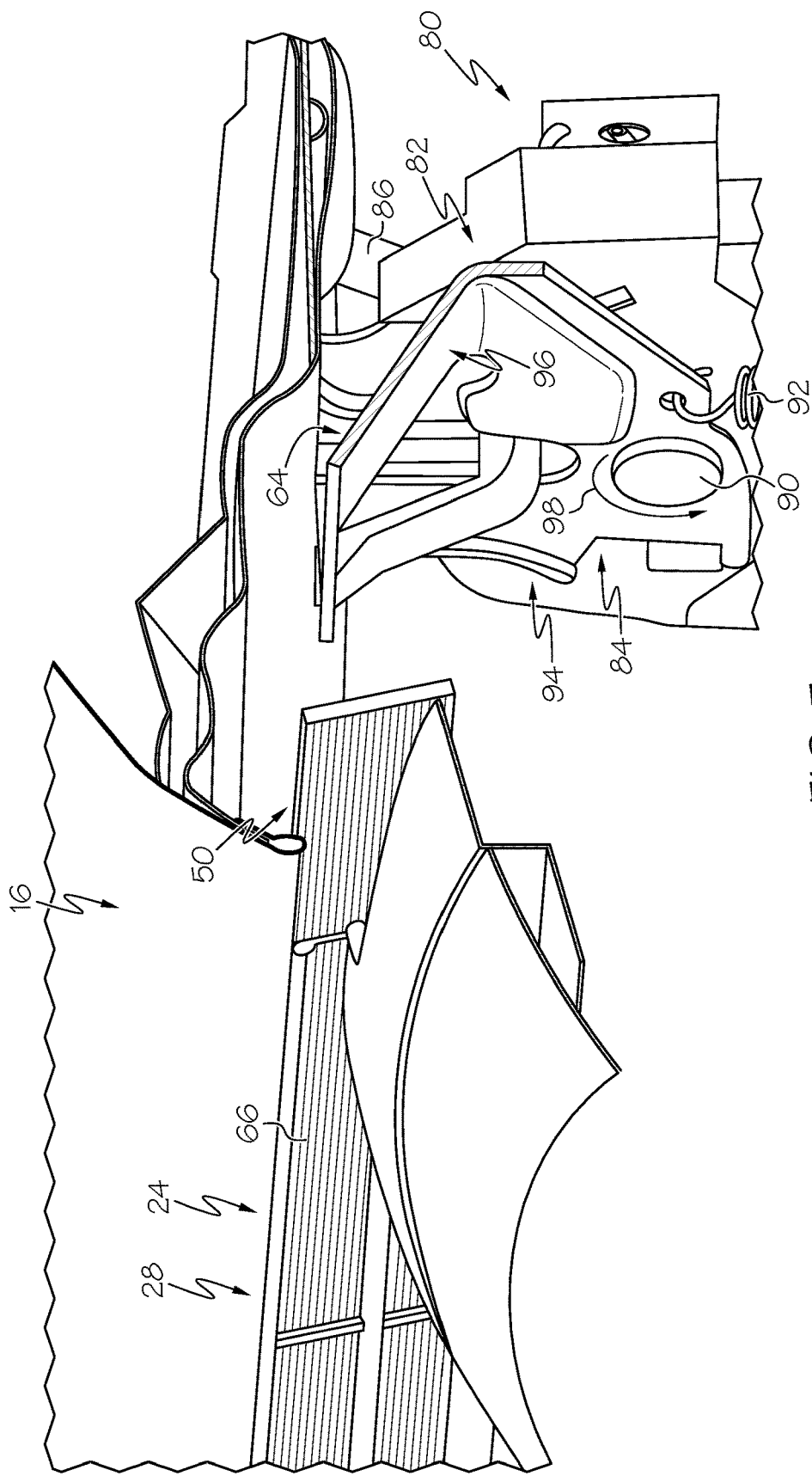
FIG. 5 is a partial section view illustrating the auxiliary lever access panel of FIG. 2 in front of a hood latch assembly, according to one or more embodiments shown and described herein.

Referring to FIG. 5, a partial section view illustrates the auxiliary lever access panel 50 in front of a hood latch assembly 80. The hood latch assembly 80 may include a primary latch assembly 82 and an auxiliary latch assembly 84. The primary latch assembly 82 may be used to lock the hood assembly 16 in the closed configuration. In some embodiments, the primary latch assembly 82 may be openable from inside the vehicle 10, for example, using a primary latch lever that is located on or under a dash of the vehicle 10. The primary latch lever may be connected to the primary latch assembly 82 using a cable 86, which can be used to actuate the primary latch assembly 82 and release the hood assembly 16. In some embodiments, actuation of the primary latch assembly 82 to release the hood assembly 16 allows the hood assembly 16 open only a short distance until the auxiliary latch assembly 80 catches the hood assembly 16 and inhibits further opening of the hood assembly 16.

The auxiliary latch assembly 84 is pivotally connected to the hood latch assembly 80 at a pivot location 90. A spring 92 or other biasing member may be used to bias the auxiliary latch assembly 84 toward a latched configuration. The auxiliary latch assembly 84 may include a latch arm portion 94 that is connected to an auxiliary lever 96. Movement of the auxiliary lever 96 in the vehicle vertical direction can cause rotation of the auxiliary latch assembly 84 in a direction of arrow 98, away from a latched configuration toward an unlatched configuration. The hood assembly 16 may be opened with the auxiliary latch assembly 84 in the unlatched configuration.

Figure 6:
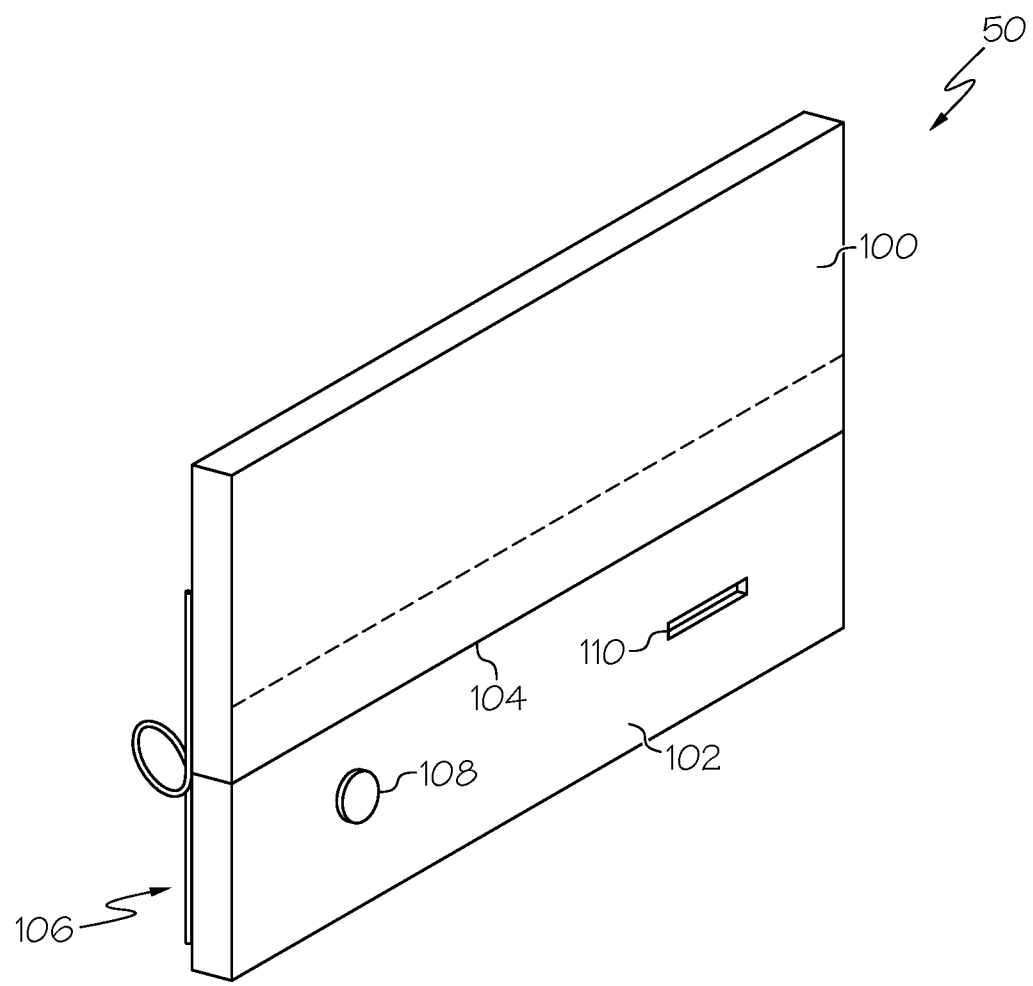
FIG. 6 illustrates the auxiliary lever access panel of FIG. 2 in isolation, according to one or more embodiments shown and described herein.

Referring to FIG. 6, the exemplary auxiliary lever access panel 50 is illustrated in isolation. The auxiliary lever access panel 50 may include a moveable portion 100 and a mounting portion 102. The moveable portion 100 may be connected to the mounting portion 102 by a hinge 104 that allows movement of the moveable portion 100 relative to the mounting portion 102. In some embodiments, the moveable portion 100 may be biased toward the illustrated closed configuration by a spring 106 or other biasing member. The mounting portion 102 may be connected to the exterior panel 66 or other suitable location using any suitable mounting arrangement, such as fastening, heat staking, etc. Mounting openings 108 and 110 may be provided through the mounting portion 102 to facilitate installation of the auxiliary lever access panel 50.

Figure 7:
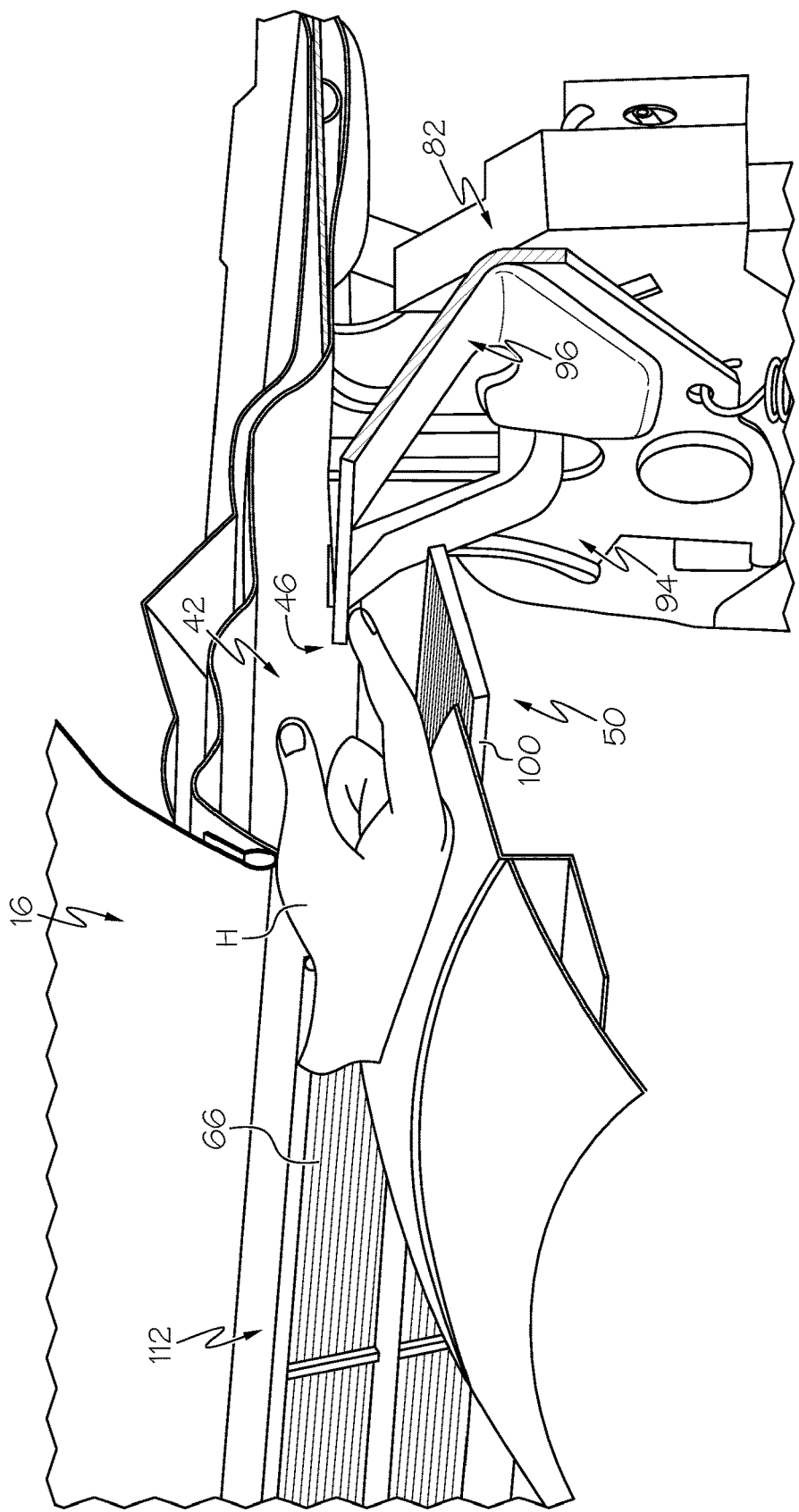
FIG. 7 illustrates the auxiliary lever access panel of FIG. 2 in operation, according to one or more embodiments shown and described herein.

Referring to FIG. 7, in operation, a user may release the hood assembly 16 from within the vehicle 10 by actuating the primary latch assembly 82. Actuating the primary latch assembly 82 allows the hood assembly 16 to open slightly thereby providing some clearance or a gap 112 between the hood assembly 16 and the exterior panel 66. The user may engage the auxiliary lever access panel 50 with a hand H. Movement of the hand H through the opening 46 causes the auxiliary lever access panel 50 to move toward the open configuration by overcoming the bias provided by spring 106 (FIG. 6) thereby exposing the opening 46 at the auxiliary lever access location 42. With the auxiliary lever access panel 50 in the open configuration, the user may then engage the auxiliary lever 96 and pivot the latch arm portion 94 out of engagement with the hood assembly 16 thereby allowing movement of the hood assembly 16 toward the open configuration. Once the hand H is removed from the opening 46, the moveable portion 100 of the auxiliary lever access panel 50 may move automatically to the closed configuration due to the bias provided by the spring 106 (FIG. 6) to conceal the opening 46.

The above-described front grille assemblies with auxiliary lever access panels can be used to conceal an opening formed in the front grille assemblies through which an auxiliary lever of a hood latch assembly can be accessed. The auxiliary lever access panels may have a color, contour or other surface feature that substantially matches or mimics the exterior texture of a surrounding exterior panel to provide an appearance of a continuous exterior panel without any opening. The auxiliary lever access panels may also be moveable to provide access to an auxiliary lever located within an engine compartment so that a user can open a hood assembly. The auxiliary lever access panels may also close the opening below the hood assembly, which can reduce air drag due to presence of the opening. In some embodiments, the auxiliary lever access panels may be spring-biased toward the closed configuration to cover the opening at the auxiliary lever access location by default. The spring force can be selected to maintain the closed configuration under normal operating conditions for the vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   a hood assembly located above an engine compartment;
   a hood latch assembly comprising an auxiliary latch assembly, the auxiliary latch assembly comprising an auxiliary lever that unlatches the auxiliary latch assembly from the hood assembly;
   a front grille assembly having an auxiliary lever access location formed as an opening between the hood assembly and the front grille assembly and within the front grille assembly; and
   an auxiliary lever access panel having a closed configuration that conceals at least a portion of the opening and an open configuration that exposes the opening to access the auxiliary lever.

2. The vehicle of claim 1, wherein the auxiliary lever access panel is biased toward the closed configuration.

3. The vehicle of claim 1, wherein the opening is bounded at opposite sides and a bottom by the front grille assembly.

4. The vehicle of claim 3, wherein the opening is unbounded at a top by the front grille assembly.

5. The vehicle of claim 1, wherein the auxiliary lever access panel comprises a mounting portion and a moveable portion that is pivotally connected to the mounting portion by a hinge.

6. The vehicle of claim 1, wherein the auxiliary lever access location is located between an emblem retaining structure and the hood assembly.

7. The vehicle of claim 1, wherein the front grille assembly includes an exterior panel, the opening of the auxiliary lever access location being formed by the exterior panel, the auxiliary lever access panel being formed of a same material as the exterior panel.

8. The vehicle of claim 1, wherein the front grille assembly includes an exterior panel, the opening of the auxiliary lever access location being formed by the exterior panel, the auxiliary lever access panel having a substantially same color as the exterior panel.

9. The vehicle of claim 1, wherein the front grille assembly includes an exterior panel, the opening of the auxiliary lever access location being formed by the exterior panel, the auxiliary lever access panel having a substantially same surface feature as the exterior panel.

10. A front grille assembly for a vehicle, comprising:
an auxiliary lever access location formed as an opening through an exterior panel; and
an auxiliary lever access panel connected to the exterior panel and located within the front grille assembly, the auxiliary lever access panel having a closed configuration that conceals at least a portion of the opening and an open configuration that exposes the opening.

11. The front grille assembly of claim 10, wherein the auxiliary lever access panel is biased toward the closed configuration.

12. The front grille assembly of claim 10, wherein the opening is bounded at opposite sides and a bottom by the exterior panel.

13. The front grille assembly of claim 12, wherein the opening is unbounded at a top by the exterior panel.

14. The front grille assembly of claim 10, wherein the auxiliary lever access panel comprises a mounting portion and a moveable portion that is pivotally connected to the mounting portion by a hinge.

15. The front grille assembly of claim 10, wherein the auxiliary lever access panel being formed of a same material as the exterior panel.

16. The front grille assembly of claim 10, wherein the auxiliary lever access panel having a substantially same color as the exterior panel.

17. The front grille assembly of claim 10, wherein the auxiliary lever access panel having a substantially same surface feature as the exterior panel.

18. A method of providing access to an auxiliary lever of a hood latch assembly, the method comprising:
providing an auxiliary lever access location through an exterior panel of a front grille assembly; and
connecting an auxiliary lever access panel to the front grille assembly thereby concealing at least a portion of the opening, the auxiliary lever access panel having a closed configuration that conceals the at least the portion of the opening and an open configuration that exposes the opening to access the auxiliary lever.

19. The method of claim 18 further comprising biasing the auxiliary lever access panel toward the closed configuration.

20. The method of claim 18 further comprising providing the auxiliary lever access panel with a substantially same surface feature as the exterior panel.

* * * * *